United States Patent
Lo et al.

(10) Patent No.: US 6,539,610 B1
(45) Date of Patent: Apr. 1, 2003

(54) METHOD FOR MANUFACTURING A MAGNETIC WRITE HEAD

(75) Inventors: Jyh-Shuey (Jerry) Lo, San Jose, CA (US); John I. Kim, San Jose, CA (US); Timothy J. Moran, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/616,838

(22) Filed: Jul. 14, 2000

(51) Int. Cl.[7] .......................... G11B 5/127; H04R 31/00
(52) U.S. Cl. ................. 29/603.07; 29/603.13; 29/603.14; 29/603.15; 29/603.16; 29/603.18; 360/119; 360/122; 360/126
(58) Field of Search .................. 29/603.07, 603.16, 29/603.18, 603.13, 603.14, 603.15; 360/110, 113, 119, 122, 126

(56) References Cited

U.S. PATENT DOCUMENTS

| | | | |
|---|---|---|---|
| 5,157,570 A | * 10/1992 | Shukovsky | 360/126 |
| 5,314,596 A | * 5/1994 | Shukovsky | 204/192.2 |
| 5,438,747 A | 8/1995 | Krounbi et al. | 29/603 |
| 5,726,841 A | 3/1998 | Tong et al. | 360/122 |
| 5,804,085 A | 9/1998 | Wu et al. | 216/22 |
| 5,871,885 A | * 2/1999 | Roh | 430/313 |
| 5,874,010 A | 2/1999 | Tao et al. | 216/22 |
| 5,912,790 A | * 6/1999 | Yoda | 360/113 |
| 5,916,423 A | 6/1999 | Westwood | 204/192.32 |
| 5,995,343 A | * 11/1999 | Imamura | 360/126 |
| 5,996,213 A | * 12/1999 | Shen | 29/603.15 |
| 6,031,695 A | * 2/2000 | Hsiao et al. | 360/126 |
| 6,034,847 A | * 3/2000 | Komuro | 360/126 |
| 6,064,552 A | * 5/2000 | Iwasaki | 360/113 |

* cited by examiner

Primary Examiner—Carl J. Arbes
Assistant Examiner—Paul Kim
(74) Attorney, Agent, or Firm—Oppenheimer Wolff & Donnelly LLP; Ron Feece

(57) ABSTRACT

A high throughput method for producing the narrow track width inductive head is also provided, whereby the heads may be manufactured in substantial volumes. The new head may be merged or piggy-backed MR or GMR heads, comprising a first pole piece, P1, and a second pole piece, P2, and is distinctly characterized by write track width is significantly reduced by a preliminary ion milling process before P1 notching is performed. The preliminary step utilizes an ion milling process to trim the write track width, P2B, at an angle between 45 to 85 degrees from the wafer normal. The MR head may then undergo conventional P1 notching.

8 Claims, 4 Drawing Sheets

METHOD FOR MANUFACTURING A MAGNETIC WRITE HEAD

BACKGROUND OF THE INVENTION

1. Field of the Invention

The present invention generally relates to thin film inductive read-write heads for use in magnetic storage systems. More particularly, the present invention is directed to high throughput methods for the rapid production of thin film inductive read-write heads having very narrow write track widths, to inductive read write heads so produced, and to the associated apparatus and methods for their use.

2. Description of Related Art

In magnetic disk drives, data is written and read by magnetic transducers called "heads." The magnetic disks are rotated at high speeds, producing a thin layer of air called an air bearing surface (ABS). The read and write heads are supported over the rotating disk by the ABS, where they either induce or detect flux on the magnetic disk, thereby either writing or reading data. Layered thin film structures are typically used in the manufacture of read and write heads. In write heads, thin film structures provide high areal density, which is the amount of data stored per unit of disk surface area, and in read heads they provide high resolution.

A thin film write head comprises two pole pieces, a top pole piece P1 and a bottom pole piece P2. A write head generally has two regions, denoted a pole tip region and a back region. The pole pieces are formed from thin magnetic material films and converge in the pole tip region at a magnetic recording gap, known as the zero throat level, and in the back region at a back gap. The zero throat level delineates the pole tip region and back region. A write head also has two pole tips, P1T and P2T, associated with and extensions of P1 and P2 respectively. The pole tips, which are relatively defined in their shape and size in contrast to the pole pieces, are separated by a thin layer of insulation material such as alumina, referred to as a gap. As a magnetic disk is spinning beneath a write head, the P2 pole tip trails the P1 pole tip and is therefore the last to induce flux on the disk. Thus, the P2T dimension predominantly defines the write track width of the write head, and is generally considered an important feature.

The write track width, P2B, is especially important because it limits the areal density of a magnetic disk. A narrower track width translates to greater tracks per inch (TPI) written on the disk, which in turn translates to greater areal density. However, with present manufacturing methods for read-write heads, the ability to produce very narrow track widths is limited. These limitations will be further explained with reference to a specific type of inductive head. Inductive heads commonly employed at present are magnetoresistive (MR) sensors, which are highly sensitive to changes in magnetic flux on a disk written by inductive write heads. An MR sensor comprises a thin film layer sandwiched between bottom and top insulation layers, or gaps, which are in turn sandwiched between bottom and top shield layers, S1 and S2. An MR head can read information on a magnetic disk with much narrower track widths an much higher fidelity than other known types of read heads. The apparent ability of MR sensors to read very narrow track widths may enable the use of narrow track width write heads and therefore lead to high areal densities. While this advantage has been sought through the use of photoresist frame plating and ion beam milling of write heads, manufacturing heads with very narrow P2B track widths remains a significant challenge.

A particular type of MR head is a merged MR head. A merged MR head uses the top shield S2 of the MR head as the bottom pole P1 of the write head. Thus, this layer is shared by each of the read and write heads. While merged MR heads have a high capacity for both reading and writing, they are limited in the narrowness of the track width they may utilize because they have been found to possess large side-fringing fields during recording. These fields are caused by differences in P1T and P2T widths. The fringing field, caused by flux leakage from P2 to P1 beyond the width of P2, is the portion of the magnetic field which extends toward the tracks adjacent to the tracks being written. The fringing fields require lower TP1 in order not to impinge adjacent tracks, thereby limiting the achievable areal density.

Prior art practitioners have sought to reduce fringing fields in merged MR heads. Typically, this involves manufacturing heads with vertically aligned P1T and P2T side walls. A method exemplary of one which addresses this issue is found in U.S. Pat. No. 5,438,747, entitled "Method of Making a Thin Film Merged MR Head With Aligned Pole Tips," incorporated herein by reference. Manufacturing techniques directed to achieving P1 and P2 pole tips of substantially similar widths do effectively reduce the fringing field. However, they may be unfortunately limiting in their ability to produce substantially narrow P2B track widths. Therefore, while the capacity for high areal density is preserved through manufacturing methods which are aimed at reduction of fringing fields, it may actually be hampered by those same manufacturing methods which place an undesirable lower limit on the size of P2B write head track width. Furthermore, they produce an additional manufacturing burden in the form of cleanup of redeposited material, which translates to greater time and higher production costs.

Other MR head manufacturing methods have addressed the issue of reducing the write track width. An example is U.S. Pat. No. 5,726,841 entitled, "Thin Film Magnetic Head With Trimmed Pole Tips Etched by Focused Ion Beam for Undershoot Reduction," incorporated herein by reference. While the use of a focused ion beam tool (FIB) may effectively produce a narrow P2B track width, the technique would be performed a separate time for each head. In typical manufacturing processes which develop more than 20,000 heads per wafer, use of FIB is not feasible.

As previously mentioned, other methods for manufacturing heads with vertically aligned pole tip side walls include forming the P2 pole tip either by photoresist frame plating or ion beam milling. In these cases, the P2T is plated with additional thickness as it is used as a mask during the processing which trims the pole tip width, removing pole tip thickness in the process. Sufficient pole tip thickness must be retained throughout the milling process for a pole tip to have a suitable aspect ration. Aspect ratio is the thickness/width of a pole tip, and should generally be greater than about 2. The width of the pole tip P2B that may be fabricated by present methods is limited, then, by the amount of pole tip thickness that may be lost during pole tip width milling. This, and other limitations inherent to current manufacturing technology, reates significant challenges in the production of very narrow pole tip read/write heads.

SUMMARY OF THE INVENTION

It is a purpose of the present invention to improve the current limitations known in read-write head track widths incurred by practical limitations of current manufacturing methods. Specifically, an object of the present invention is to improve write head track width by nearly an order of magnitude.

The invention utilizes a preliminary milling step before standard P1 notching in order to create a P2B track width that is substantially sub-micrometer and narrower than that which could previously be realized. Larger amounts of P1 material may then be removed during P1 milling procedures, the write track dimension having already been reduced.

It is a further object of the invention to produce the narrow write track heads by a method that enables high throughput manufacturing. A preliminary milling step may be utilized on a wafer in a high throughput manufacturing system, wherein the write track width P2B may be milled to a very narrow dimension before it is divided into multiple heads. The invention thereby enables a novel application of a preliminary precision milling step to substantially reduce the write track width of many heads on a single substrate.

The preliminary milling step of the present invention occurs before standard P1 notching. It employs a wafer manufacturing process such as ion beam milling to perform P2 pole trimming and mill the write track width prior to P1 notching. The write track width is milled at an angle, preferably 45° to 85° from the wafer normal, effecting a precise removal of material. As used in this specification, the term "wafer normal" refers to a direction substantially perpendicular to the plane in which the wafer is oriented. The precision P2B milling may then be followed by less precise, conventional P1 milling, which provides alignment of P1T and P2T sidewalls for reduction of fringing fields.

The present invention, therefore, yields several surprising advantages over the prior art. A thin film inductive read write head manufactured according to a method exemplary of the invention will have a write track significantly less than that which has been previously known. This will yield a substantial increase in the areal storage of magnetic disk drives. Furthermore, the present invention enables high throughput manufacturing systems for producing large quantities of the narrow write track inductive heads.

The foregoing and other objects, features, and advantages of the present invention will be apparent from the following detailed description of the preferred embodiments which makes reference to several drawing figures.

DETAILED DESCRIPTION OF THE PREFERRED EMBODIMENT

In the following description of the preferred embodiments reference is made to the accompanying drawings which form the part thereof, and in which are shown by way of illustration of specific embodiments in which the invention may be practiced. It is to be understood that other embodiments may be utilized and structural and functional changes may be made without departing from the scope of the present invention.

Objects of the present invention include providing a method for producing both merged and piggy back (not merged) MR and GMR heads with substantially narrowed write tracks, and the ability to feasibly produce the read-write heads in high volume. The invention seeks to address these objects with a novel approach to overcome limitations inherent to the technology utilized in the prior art. In view of these objects, the description will continue in an illustrative sense with respect to various exemplary embodiments of the invention.

Figure 1:
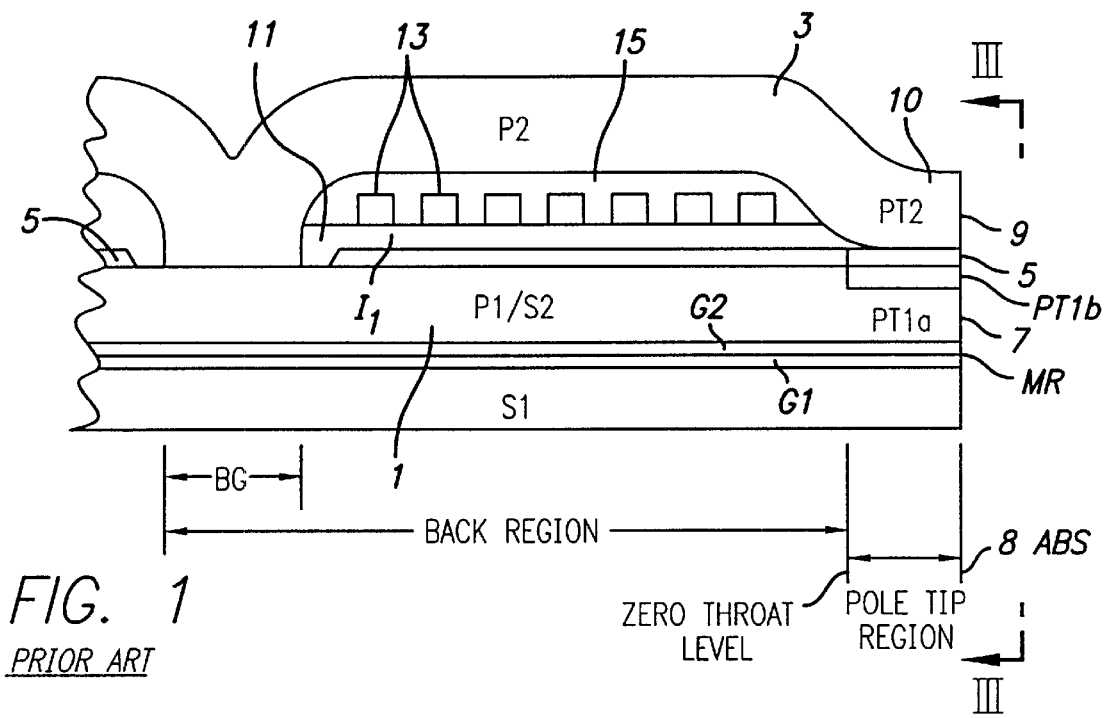
FIG. 1 is a side view of a typical thin film merged MR head.

A merged MR or GMR head as shown in FIG. 1 is manufactured using a new, preliminary precision milling step prior to P1 notching. The head comprises two pole pieces 1 and 3 denoted P1 and P2, respectively. P1, in a merged head, also serves as the second shield S2 for the read portion of the head. The pole pieces 1 and 3 are separated by a gap 5 and bounded by an ABS 8 at a pole tip region of the head. P1 and P2 are magnetically connected where they are separated by the gap. The pole pieces converge at a back region of the head, such that they are not separated by a gap in this region. Extending from the pole pieces are two pole tips 7 and 9 in the pole tip region, denoted PT1 and PT2 respectively. The pole tips are shaped and defined relative to their respective pole pieces by manufacturing processes such as ion beam milling. A merged MR head also comprises a first insulation layer 11, a coiled conductor layer 13, and a second insulation layer 15.

A method according to an embodiment of the present invention employs a combination of known thin film photolithography and ion beam milling steps with a unique, precise ion beam milling preliminary manufacturing step. In the exemplary embodiment, photolithography is used to deposit magnetic layers using photoresist frame plating, and is used to deposit insulation layers with a photoresist and developing process. Those skilled in the art will appreciate that photolithography is exemplary only and that alternative deposition methods are contemplated as being within the scope of the present invention. These can include electroplating, cathodic sputtering, ion beam deposition, and the like. The inventive preliminary step, in an exemplary embodiment, will employ precision milling to remove very small amounts of material in the base region of the upper pole tip P2T, and reduce the write track width P2B to a very narrow dimension. The precision milling of a narrow P2B write track width may then be followed by conventional pole tip trimming and pole piece notching.

Figure 2:
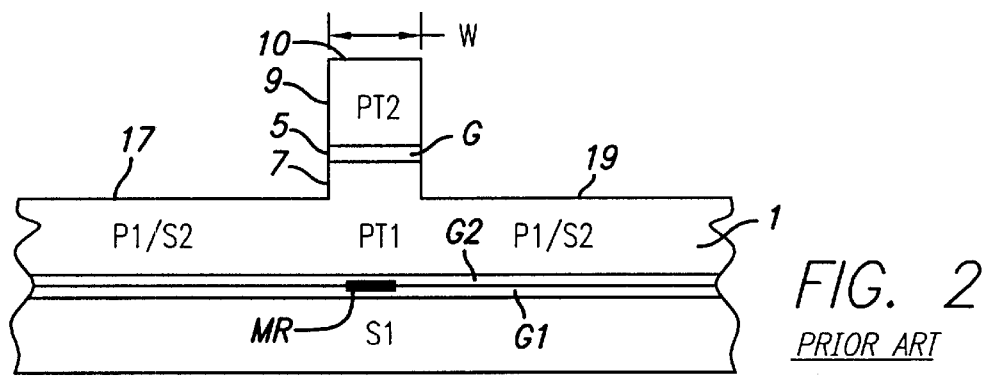
FIG. 2 is an ABS view of a typical thin film merged MR head taken along plane III—III.
Figure 3:
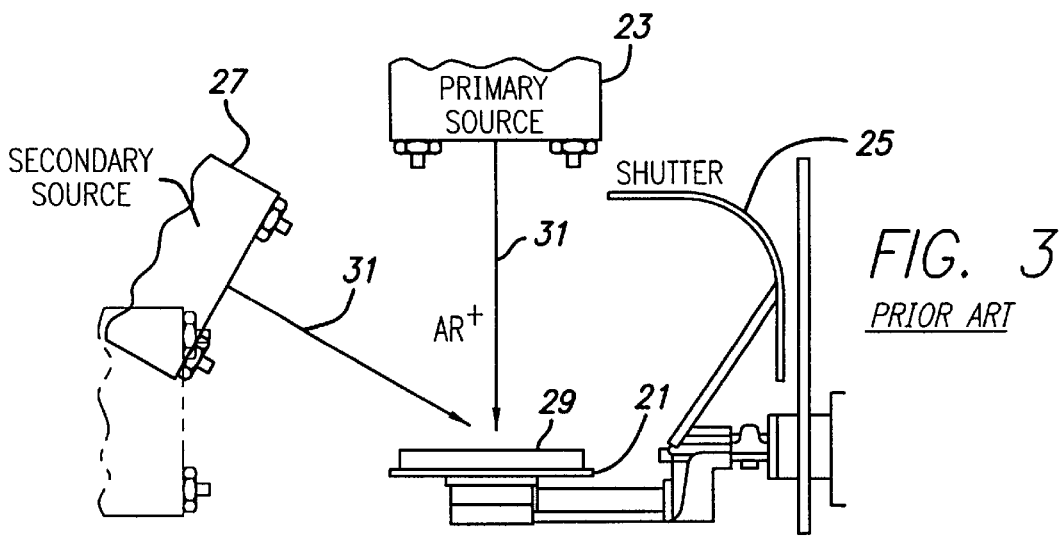
FIG. 3 is a schematic of an exemplary ion beam chamber.

Definition of the pole tips is shown in FIG. 2, where the pole tips 7 and 9 are separated by a gap 5. Fringing fields, which limit the narrowness of pole tips in the prior art, are caused by the greater width of the first pole piece 1 relative to the narrow gap 5 and second pole tip 9. Methods known in the prior art for reducing the fringing field include P1 notching, which involves removal of a significant amount of material from the first pole piece at field regions 17 and 19, as well as from the top of P2T, indicated at 10 in FIG. 1. Also, pole cleaning is used to remove redeposition material from the vertical side walls of PT1 and PT2, as shown in FIG. 2, in an effort to reduce fringing fields. Ion beam milling is a common method used for P1 notching and P1/P2 wall cleaning, but is conventionally utilized for the removal of large amounts of material from P1 1 and the top of P2 10. The significant removal of material in these processes, combined with material redeposition and cleanup, does not allow for the precision required to create sub-micrometer write track widths. Ion beam milling, for P2 pole trimming and P1 notching, is performed in a processing chamber, as shown in FIG. 3. The work piece, which may be a wafer 29 with more than 20,000 heads, is mounted on a turntable 21 and rotated while it is milled by a primary ion beam source 23 at an angle between 0° and 50° from the wafer normal. A shutter 25 may be employed to control various steps in the process. According to known manufacturing methods, a secondary ion beam source 27 may be utilized for cleanup of redeposition from P1 and P2 pole piece side walls. Alternatively, a single ion beam source may be used for both notching and cleanup operations by rotating the stage 29 to obtain the various angles appropriate for each function.

Figure 4:
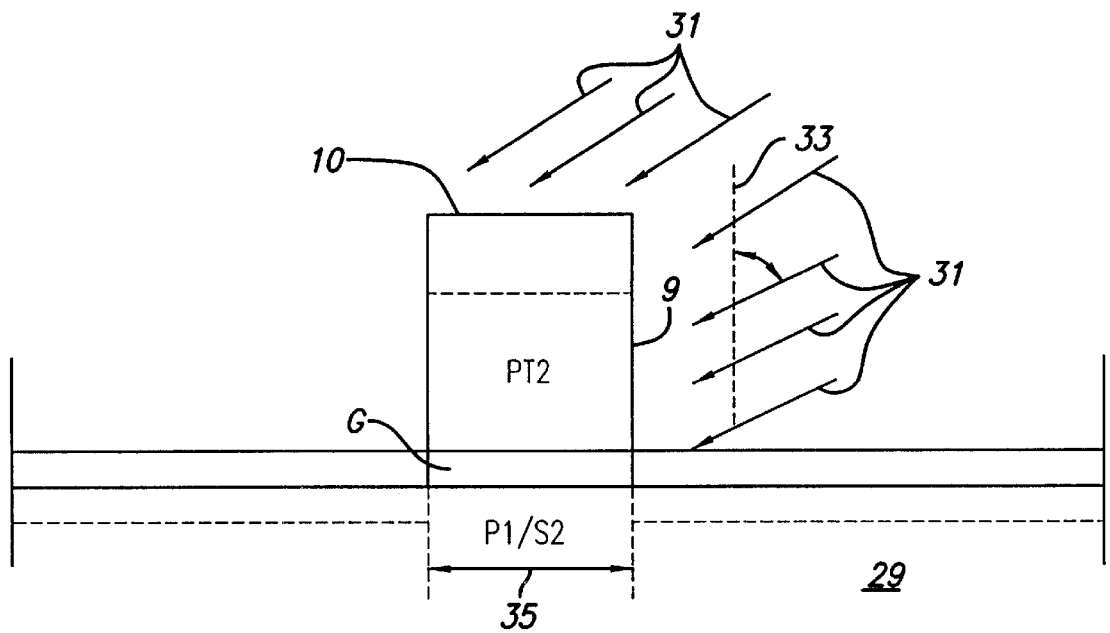
FIG. 4 is an ABS view of a first implementation of a preliminary ion beam milling step according to an embodiment of the present invention.

The unique preliminary step employs an ion beam for precise milling of the P2B track width in addition to P1 notching. The P2B milling step may occur either before or after the P1 notching. In an exemplary form of the new P2B mill step, shown in FIG. 4, the ion beam 31 is directed at the base of P2T for precise milling of the. P2B write track width 35. This precision milling step, which may be used to produce a P2B of substantially less than 1 µm, may then be followed by further P1 notching procedures which remove more material for notched P1 and redeposition-free P1/P2 sidewalls.

Ion beam etching, used for pole piece notching, requires an etching mask to protect the portions of the read-write head that are not to be etched. A common mask that is used for this purpose is a photoresist mask. For P1 notching, the P2T may be plated with additional thickness so that the pole itself, with it's extra thickness, may actually suffice as a mask. During ion beam etching, portions of the mask are actually reduced, making it desirable to use a mask that is relatively thick. However, use of a thick mask adds a high degree of difficulty in producing a very narrow P2B with presently known photolithography techniques. The present invention, therefore, enables production of a narrow P2B without the use of a thick photoresist mask.

Figure 5:
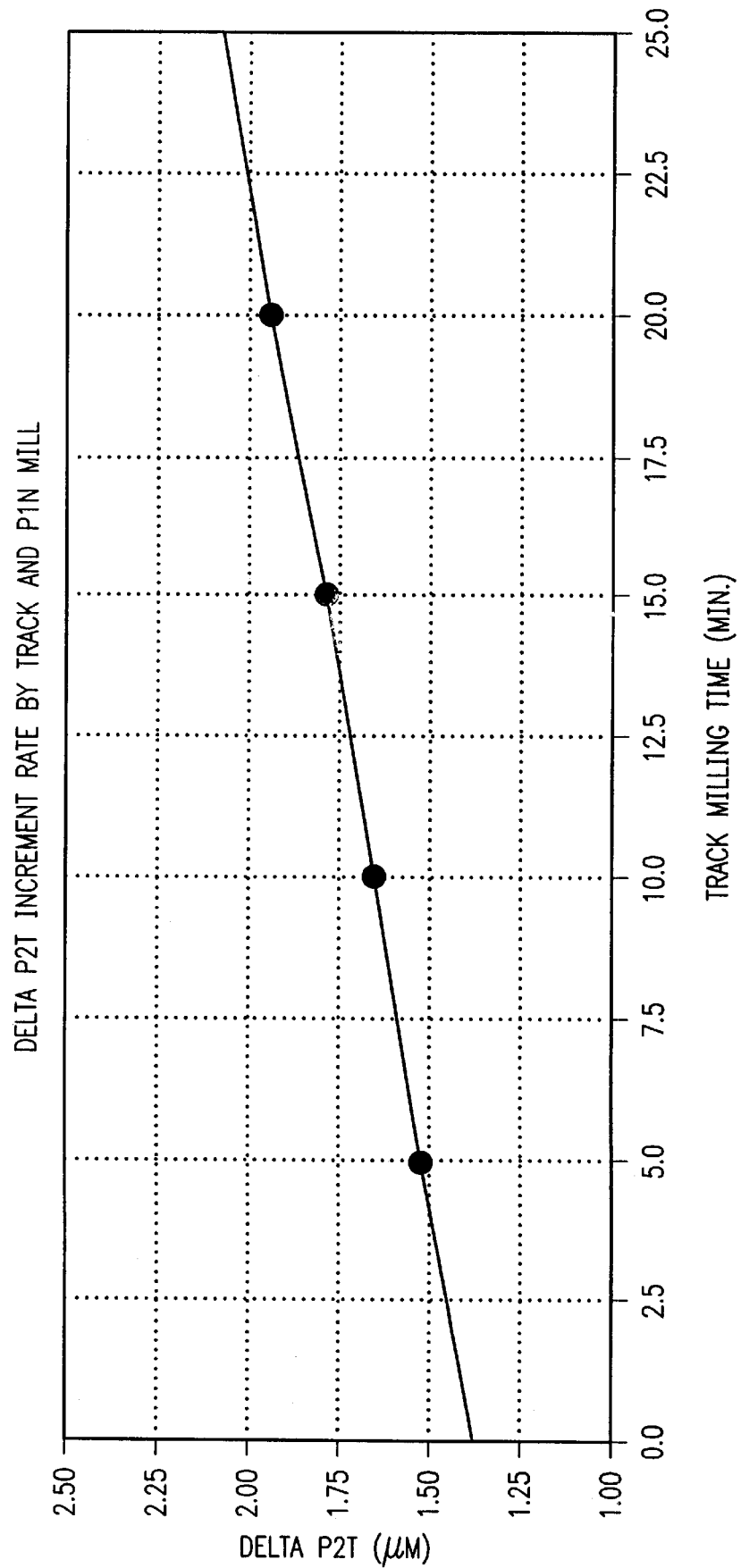
FIG. 5 is a graph which depicts the ratio of amount of P2T that is removed during the inventive P2B milling step to the time spent utilizing the P2B milling step.
Figure 6:
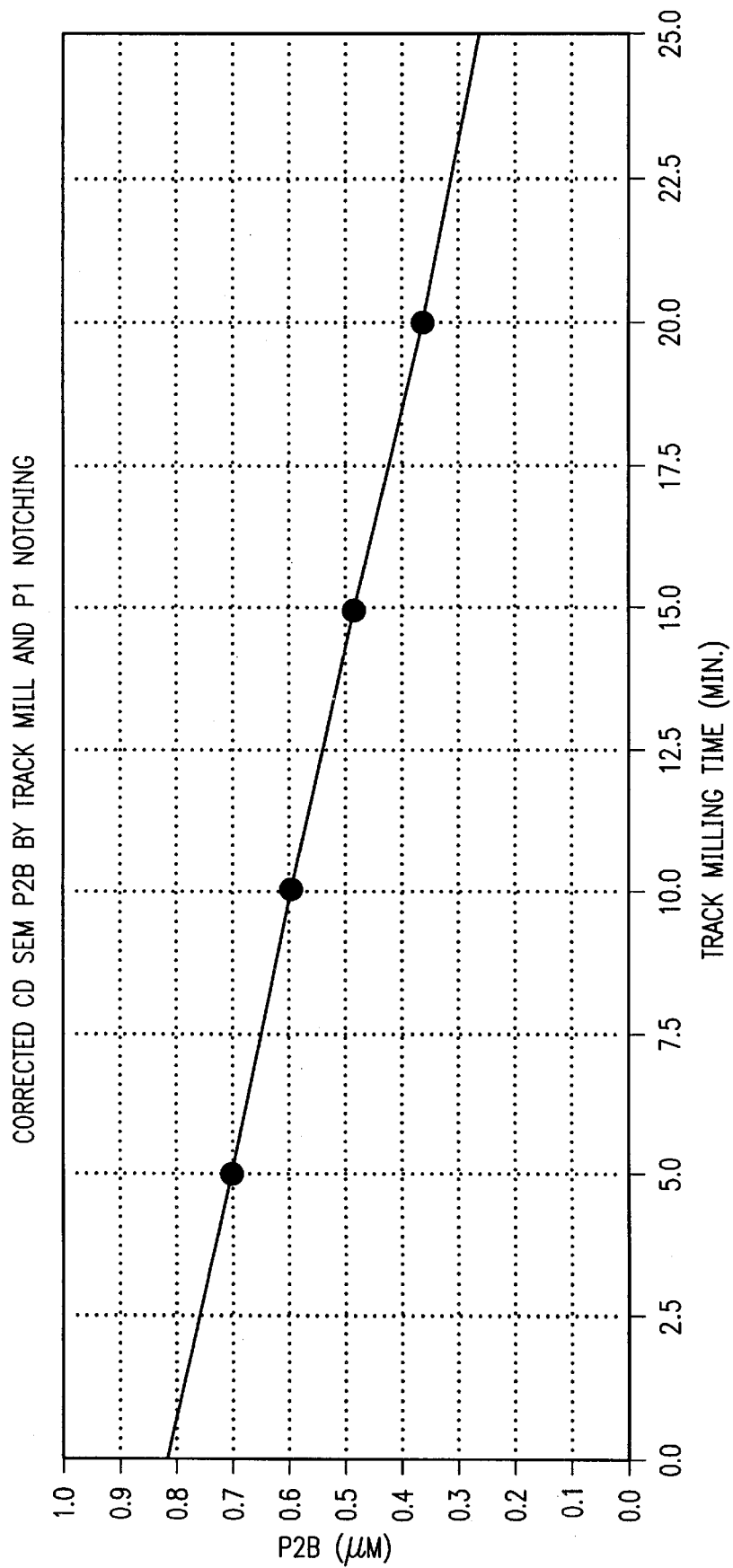
FIG. 6 is a plot of P2B write track widths vs. amount of time utilizing the inventive P2B milling step.

FIG. 5 is a graph which depicts the ratio of amount of P2T that is removed during the inventive P2B milling step to the time spent utilizing the P2B milling step. In light of the etch selectivity as plotted in FIG. 5, the range of P2B track widths that may be achieved with a method of the present invention is shown in FIG. 6. Thus, it is anticipated that track widths below 0.3 µm may be achieved by the inventive P2B milling step without consuming very much of the P2T material.

Figure 7:
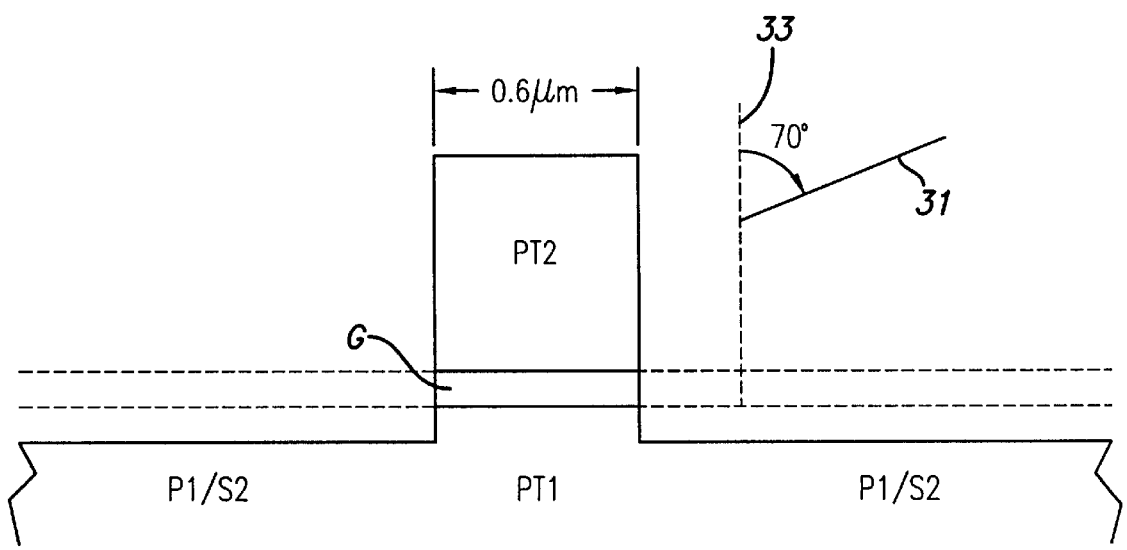
FIG. 7 is an ABS view of a differ ent implementation of a preliminary ion beam milling step according to an embodiment of the present invention.

The method of the present invention may be utilized in a variety of manufacturing sequences, and will not necessarily precede P1 notching steps. For example, in an alternate embodiment of the present invention, P2T will be plated to about 4.0 µm with a write track width of about 0.8 µm. The inventive preliminary ion beam milling step will then be used to produce a write track width that is substantially narrower. As shown in FIG. 7, an ion beam 31 will be angled at about 70 degrees to the wafer normal 33 and directed to P2B. The angled ion beam will mill the P2B to a final write track width of about 0.6 µm. It is noted that different angles, as well as different milling cycle times, will produce different track widths and may be used to produce track widths that are below 0.4 µm. Subsequent procedures, according to known methods, will remove greater amounts of material and be used to perform P1 notching to about 0.3 µm depth. The finished product will be a merged MR or GMR head with a write track that is anticipated to be substantially less than any which has been known to date.

In an exemplary manufacturing process according to an alternative embodiment of the invention, photolithography and P1 notching steps may be combined with the inventive preliminary step to produce a merged GMR head with a sub-micrometer P2B write track width. In the exemplary process, a magnetic layer is deposited on a wafer to form a second shield layer of a merged GMR head, which also serves as the bottom pole piece, P1. A second magnetic layer is deposited to form a top pole piece P2. An extension of P2 is a deposited pole tip P2T, which is defined and shaped as a smaller, pedestal-like protrusion from the P2T pole piece. The pole tip P2T is bounded by a base, a top, and two vertical side walls, the base defining the P2B write track width. At a certain point in the merged GMR head manufacturing process, before P1 notching, at least a single ion beam is directed at an angle θ to a wafer normal to trim the base of P2T and reduce the P2B. A preferred angle is between 45 degrees and 85 degrees. In the exemplary process, the precision milling of small amounts of material from the P2T base to form the narrow P2B write track width is followed by P1 notching steps that remove greater amounts of material and mutually aligned P2 and notched P1 side walls to reduce fringing fields. Thus, a merged GMR head is manufactured which has both substantial P1 notching and a substantially sub-micrometer micrometer P2B write track width.

It is now readily apparent that the aforementioned discoveries allow a merged MR or GMR head to have vertically aligned pole tips adjacent the gap layer combined with P1 notching for the purpose of fringe field reduction while also having precision-milled P2B for a very narrow track width. The merged MR or GMR head manufactured according to various embodiments of the present invention will have a track width that is substantially sub-micrometer and much narrower than any previously achieved in high throughput manufacturing systems.

The foregoing description of the preferred embodiments of the invention has been presented for the purposes of illustration and description. It is not intended to be exhaustive or to limit the invention to the precise form disclosed. Many modifications and variations are possible in light of the above teaching. For example, the preliminary step of the present invention may be utilized before or after additional P1 notching steps. The ion beam of the preliminary step may be directed at various angles and milling cycle times to produce various track widths. More than one angled ion beam may be implemented to mill a narrow track width and clean up any redeposited material simultaneously. It is intended that the scope of the invention be limited not by this detailed description, but rather by the claims appended hereto.

What is claimed is:

1. A method for manufacturing a magnetic write head, said method comprising:

providing a wafer having a surface and wafer normal perpendicular thereto;

forming a first magnetic layer over said wafer;

forming a second magnetic layer over said first magnetic layer, said second magnetic layer configured with first and second side walls defining a first width therebetween;

performing a first ion milling operation to remove material from said side walls of said second magnetic layer to reduce said first width defined therebetween to a second width, said first ion milling being performed at an angle of between 45 and 85 degrees relative to said wafer normal; and after said first ion milling operation, performing a second ion milling operation at angle substantially closer to said wafer normal to remove material from said first magnetic layer using said second magnetic layer with said second width as a mask to generate first and second side wall portions on said first magnetic layer, said first and second side walls formed on said first magnetic layer defining a width therebtween substantially equal to said second width of said second magnetic layer.

2. The method of claim 1 further comprising performing a third ion milling operation to remove material from said first and second side walls of said first and second magnetic layers, said third ion milling step being performed so as to remove material at a slower rate than said second ion milling step.

3. A method as recited in claim 2 wherein said third ion milling step is performed after said first and second ion milling steps.

4. A method as recited in claim 2 wherein said third ion milling step is directed at an angle of between 45 degrees and 85 degrees relative to said wafer normal.

5. A method as recited in claim 1 wherein said first ion milling step is directed at an angle of about 70 degrees relative to said wafer normal.

6. A method as recited in claim 2 wherein said third ion milling step is directed at an angle of about 70 degrees relative to said wafer normal.

7. A method as recited in claim 1 wherein said second width is less than 0.8 $\mu$m.

8. A method as recited in claim 1 wherein said second width is less than 0.4 $\mu$m.

* * * * *